United States Patent [19]

Chang et al.

[11] Patent Number: 4,979,998

[45] Date of Patent: Dec. 25, 1990

[54] PROCESS FOR FORMING A METAL BORIDE COATING ON A CARBONACEOUS SUBSTRATE

[75] Inventors: Ching F. Chang; Raymond V. Sara, both of Strongsville, Ohio

[73] Assignee: Union Carbide Corporation, Danbury, Conn.

[21] Appl. No.: 419,331

[22] Filed: Oct. 10, 1989

[51] Int. Cl.$^5$ .................. C23C 6/00; C23C 16/30; C23C 16/38; C23C 20/08

[52] U.S. Cl. .................. 148/279; 148/269; 148/30

[58] Field of Search .................. 148/279, 269, 278, 30

[56] References Cited

U.S. PATENT DOCUMENTS

| | | | |
|---|---|---|---|
| 3,503,708 | 3/1970 | Spry | 23/209.2 |
| 3,744,979 | 7/1973 | Kalish | 148/279 |
| 3,796,587 | 3/1974 | Sara | 117/71 R |
| 3,824,134 | 7/1974 | Chance | 148/279 |
| 3,922,038 | 11/1975 | Scales | 148/279 |
| 4,402,764 | 9/1963 | Clark | 148/279 |
| 4,857,116 | 8/1989 | Allan | 148/279 |

FOREIGN PATENT DOCUMENTS

| | | | |
|---|---|---|---|
| 144930 | 11/1980 | German Democratic Rep. | 148/279 |
| 0004251 | 1/1976 | Japan | 148/279 |
| WO82/03094 | 9/1982 | PCT Int'l Appl. | 148/279 |
| 1455951 | 11/1976 | United Kingdom | 148/279 |

OTHER PUBLICATIONS

Boronizing for Erosion Resistance; Biddulph; Thin Solid Films 1977, pp. 341–347.

*Primary Examiner*—Jay H. Woo
*Assistant Examiner*—Jeremiah F. Durkin, II
*Attorney, Agent, or Firm*—E. Lieberstein

[57] ABSTRACT

A process to form a uniform metal boride coating on a carbonaceous substrate by first forming a metal carbide coating and reacting the carbide coating with a boron compound.

10 Claims, 2 Drawing Sheets

1

PROCESS FOR FORMING A METAL BORIDE COATING ON A CARBONACEOUS SUBSTRATE

This invention relates to a process for forming a metal boride coating on a carbonaceous substrate.

BACKGROUND OF THE INVENTION

Boride coatings are difficult to form on substrate surfaces composed of carbon or graphite. The most common method for applying a boride coating to a carbon or graphite substrate is by means of chemical vapor deposition (CVD) whereby the substrate is heated in the presence of a gaseous mixture such as $BCl_3 + TiCl_4 + H_2$. This process is expensive and is a line of sight process which makes coating uniformity a problem particularly for an object such as a multifilament yarn. Other methods for forming a boride coating such as plasma spraying have been less successful in that cracks form on cooling.

SUMMARY OF THE INVENTION

A process has been developed in accordance with the present invention to form a uniform metal boride coating on a carbonaceous substrate particularly a carbon filament or multifilament yarn independent of the size or configuration of the yarn. The process of forming a coating of a metal boride on a carbonaceous substrate in accordance with the present invention comprises the steps of: forming a metal carbide coating upon the surface of said carbonaceous substrate with a metal selected from the group of IVB, VB and VIB of the periodic table as published by Fisher Scientific and reacting the metal carbide coating in a nonreactive atmosphere under controlled temperature conditions with a boron containing compound to cause a reaction between the metal in said carbide coating and the boron in said boron containing compound thereby forming a coating of a boride of said metal.

DESCRIPTION OF A PREFERRED EMBODIMENT OF THE INVENTION

Figure 1:
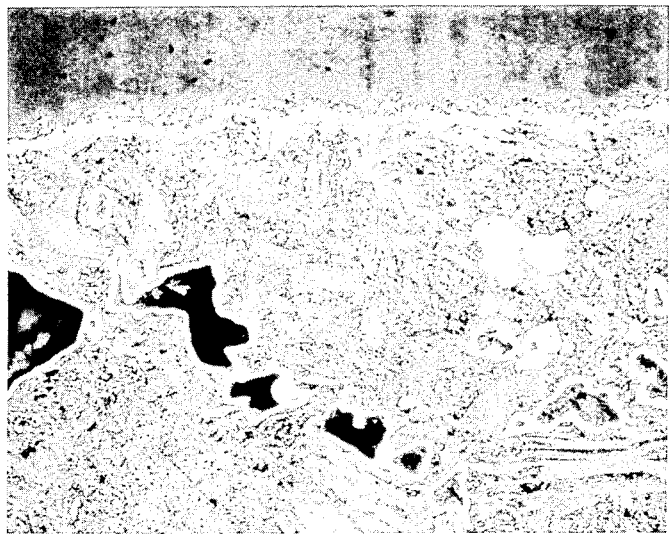
FIG. 1 is a photomicrograph of a test section of Grade ATJ graphite from Example II showing the formation of a thin coating of a metal carbide on the graphite surface; and FIG. II is a photomicrograph of a section of the metal carbide coated graphite from Example II which was treated in accordance with the present invention to convert the metal carbide coating to a metal boride coating.

The subject invention may be used for coating any carbon or graphite body with a metal boride, but is particularly advantageous for coating a monofilament or multifilament carbon or graphite yarn. Carbon and graphite filament of multifilament yarn is commercially available. One method for forming graphite yarn from a carbonized polymeric fibrous material is disclosed in U.S. Pat. No. 3,503,708 issued Mar. 31, 1970.

In accordance with the method of the present invention the surface of the carbon or graphite monofilament or multifilament yarn is treated to deposit a coating of a metal carbide over the carbon or graphite surface. The metal carbide coating may be formed from any metal selected from the group IVB, VB and VIB of the periodic table published by Fisher Scientific. A metal carbide coating can be deposited using any conventional coating technique including plasma spraying. Other conventional methods include heat treating the carbonaceous body in the presence of a chloride of the metal to be formed, e.g. titanium tetrachloride (TiCH), or by reacting the carbon or graphite body with an oxide of the metal to be formed such as $TiO_2$. The preferred method is to immerse the carbon or graphite body into a molten bath containing a metal capable of reacting with carbon to form a metal carbide and an acid soluble metal which is capable of alloying with the carbide forming metal but which itself does not react with carbon to form a metal carbide. The carbon body is held immersed in the molten bath for a time sufficient to effect reaction between the carbon body and the carbon forming metal. Among the metals capable of reacting with carbon to form a metal carbide are titanium, zirconium, hafnium, vanadium, niobium, tantalum, chromium, molybdenum and tungsten. Among the acid-soluble metals which do not react with carbon to form a metal carbide are indium, germanium, gallium, tin, antimony, bismuth, silver, copper and the like. For example, if a titanium diboride coating is desired the metal titanium is used as the carbide forming metal. The alloyed acid soluble metal may be selected from any of the nonreactive metals indicated above, such as tin. The carbide forming metal is first heated to a temperature which is sufficient to render it molten. The nonreactive metal is then dissolved into the bath to form an alloy. The carbonaceous body is then immersed into the metal bath to permit a titanium carbide coating to form on the surface of the carbon body. Thereafter the titanium coated body is removed from the molten alloy and, after cooling, is immersed in an acidic solution, such as HCl, to dissolve the unreacted acid soluble metal from the surface. The method of forming a metal carbide layer on a carbon fiber surface is disclosed in detail in U.S. Pat. No. 3,796,587; the disclosure of which is herein incorporated by reference.

Once a coating of metal carbide is formed the metal carbide coated carbonaceous body is then reacted with a boron containing compound under conditions to cause a reaction between the metal in the carbide coating and the boron in the boron containing compound to produce a boride or diboride coating. The boron containing compound may be, for example B, $H_3BO_3$, $BPO_4$, $B_2O_3$, $B_4C$, BN, $BCl_3$, and the like. The metal carbide is converted to a metal boride or metal diboride under reactions conditions above a threshold temperature of at least 1200° C. but preferable above 1400° C. in a nonreactive or essentially inert atmosphere of e.g. argon. Oxygen in a small percentage of no more than about 2% may be introduced into the inert atmosphere to held scavenge the carbon from the reaction of the metal carbide and the boron containing compound.

The following are examples of the method of the present invention:

I (a) Carbon fibers in the form of two ply yarn were passed through an indium/5 w/o titanium melt. The yarn was kept submerged in the melt via a series of graphite guides and a wheel mounted on the graphite melt container. This assembly was housed in a tube furnace which was maintained at 1000° C. and purged with argon until the carbon fibers were continuously coated with TiC. The carrier metal was removed by dissolution in 50% HCl. The coated fibers were flexible and retained 90% of the original properties.

(b) The TiC coated fibers were then packed in $B_4C$ powder and heated to 1400° C. for one hour. After removing excess powder, the reacted fibers were examined by X-ray diffraction and by scanning electron microscope. Both analytical techniques confirmed the presence of $TiB_2$. Similar results were obtained for fibers packed in BN powder and in boronated graphite powder.

II

In this example, 40 g of indium shot (Johnson Matthey, Inc.) and 1.23 g of titanium powder (Morton Thiokol −200 mesh) were loaded into a small graphite crucible, then melted and alloyed at 1050° C. in vacuum. A $\frac{1}{4}''\times\frac{1}{4}''\times\frac{3}{4}''$ piece of UCAR Carbon Company Grade ATJ graphite was threaded to a $\frac{1}{8}''$ diameter graphite plunger rod and the assembly was positioned above the melt. The In/Ti alloy was reheated in vacuum to 1050° C. and the ATJ graphite was lowered into the melt and kept submerged for one hour. The test piece was withdrawn at the end of this time and allowed to cool. The adhering In/Ti alloy was removed by dissolution in HCl acid. After washing in water and drying, a section was cut from the rectangular piece for metallographic and X-ray analysis.

According to X-ray diffraction, the principal surface phase was TiC. The coating depicted in FIG. 1 micrograph is almost 4 mm thick. It can be seen the TiC coating is well bonded to the graphite and continuous.

Figure 2:
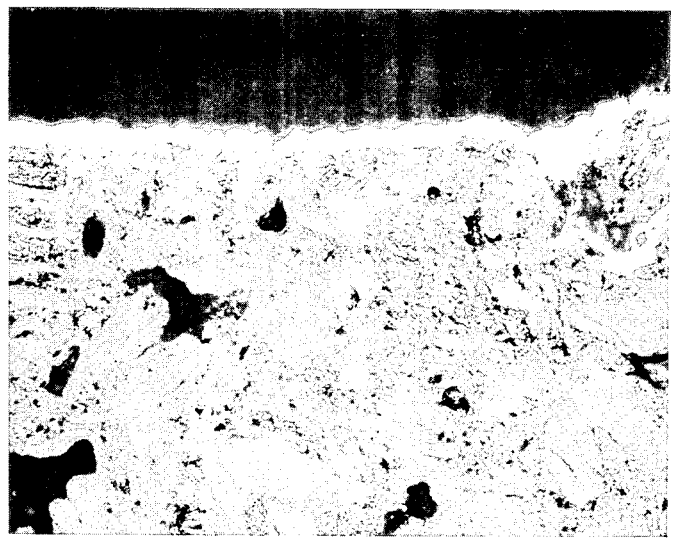

A $\frac{1}{4}''$ length was cut from the above TiC-coated ATJ graphite and then packed in $B_4C$ powder. The specimen and pack were heated in argon to 1800° C. for one hour. X-ray diffraction indicated TiC was converted to $TiB_2$ and the photomicrograph in FIG. 2 shows a $TiB_2$ coating which is about 10 mm thick.

The above graphite segment with a converted $TiB_2$ coating was readily wetted by aluminum in vacuum after ten minutes at 950° C.

What we claim is:

1. A process for forming a metal boride coating on a carbonaceous substrate comprising the steps of: forming a metal carbide coating upon the surface of said carbonaceous substrate and reacting the metal carbide coating with a boron containing compound in a nonreactive atmosphere under a controlled temperature of at least 1200° C. to cause a reaction between the metal in said metal carbide coating and the boron in said boron containing compound thereby forming a coating of a boride of said metal.

2. A process as defined in claim 1 wherein said boron containing compound is selected from the group consisting of B, $H_3BO_3$, $BPO_4$, $B_2O_3$, $B_4C$, BN and $BCl_3$.

3. A process as defined in claim 2 wherein said nonreactive atmosphere is an essentially inert gaseous atmosphere.

4. A process as defined in claim 3 wherein said inert atmosphere is argon.

5. A process as defined in claim 3 further comprising adding a small mount of oxygen to said inert gas.

6. A process as defined in claim 5 wherein said oxygen content is limited to no more than about 2%.

7. A process as defined in claim 3 wherein said carbonaceous substrate is a monofilament or multifilament of carbon.

8. A process as defined in claim 3 wherein said carbonaceous substrate is a monofilament or multifilament of graphite.

9. A process as defined in claims 7 or 8 wherein said metal carbide coating is formed by immersing the carbonaceous substrate into a molten bath containing a metal capable of reacting with carbon to form a metal carbide and an acid soluble metal capable of alloying with the carbide forming metal but which itself does not react with carbon to form a metal carbide.

10. A process as defined in claim 9 wherein the metal carbide coating includes a metal selected from the group consisting of titanium, zirconium, nafnium, vanadium, niobium, tantalum, chromium, molydenum and tungsten.

* * * * *

UNITED STATES PATENT AND TRADEMARK OFFICE
CERTIFICATE OF CORRECTION

PATENT NO. : 4,979,998
DATED     : 12/25/90
INVENTOR(S) : C. F. Chang, R.V. Sara It is certified that error appears in the above-identified patent and that said Letters Patent is hereby corrected as shown below:

Column 2, line 50, "tions" should read "tion"

Column 2, line 54, "held" should read "hold"

Signed and Sealed this

Fifth Day of May, 1992

Attest:

DOUGLAS B. COMER

*Attesting Officer*     *Acting Commissioner of Patents and Trademarks*